UNITED STATES PATENT OFFICE.

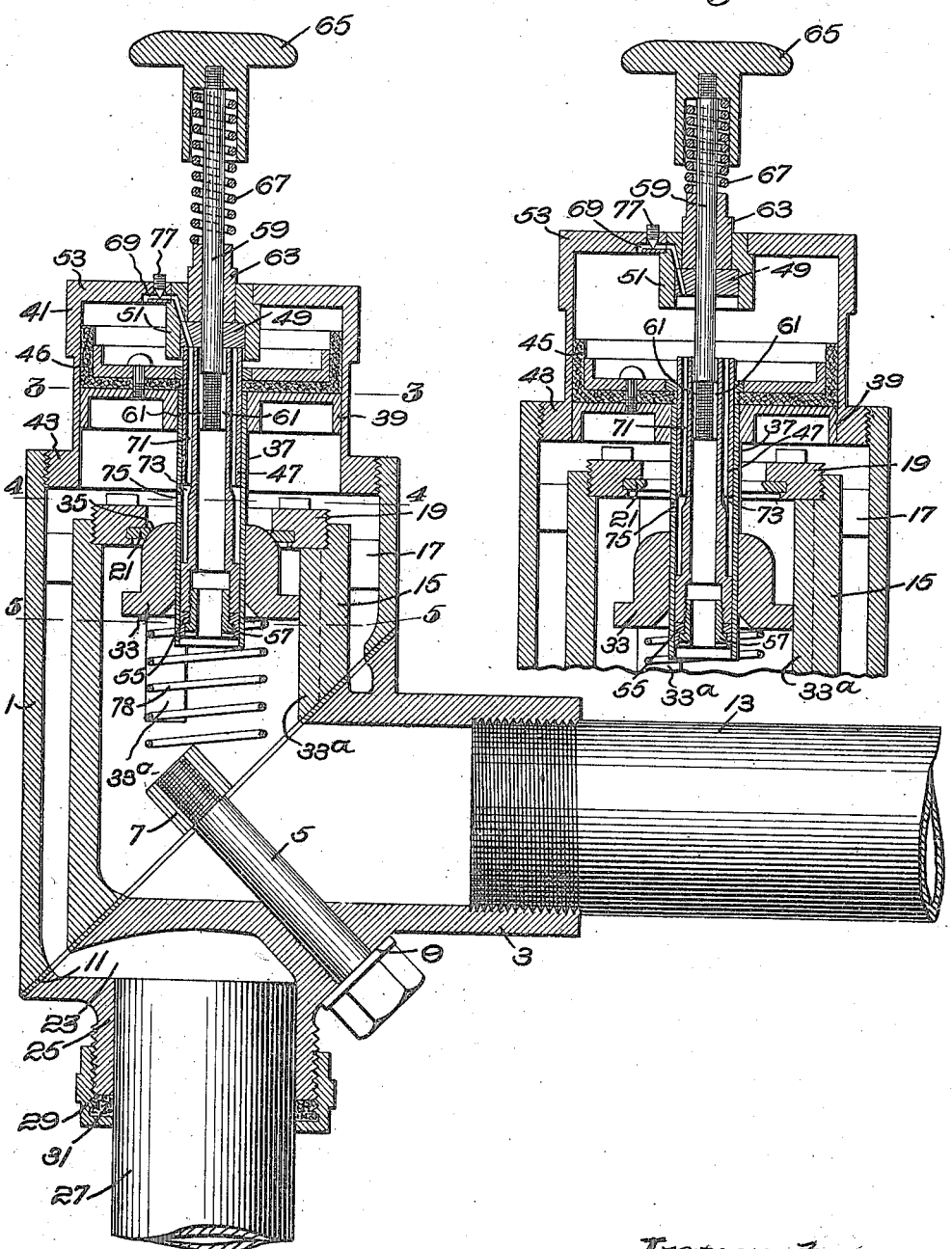

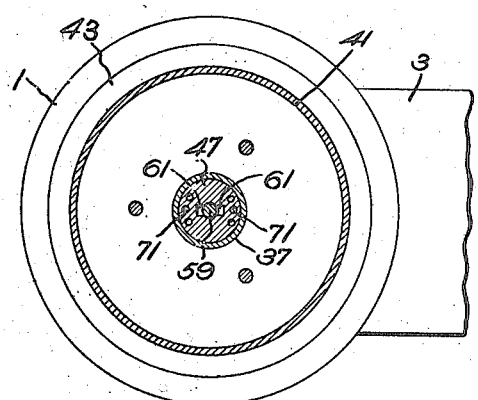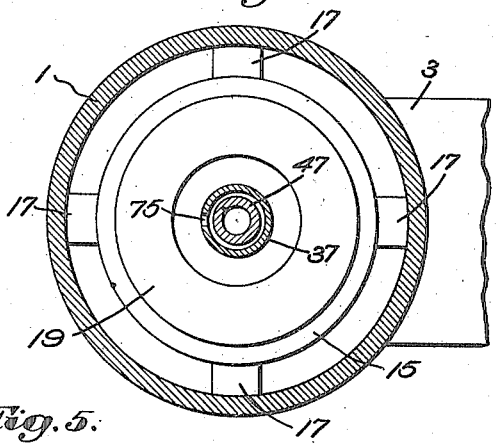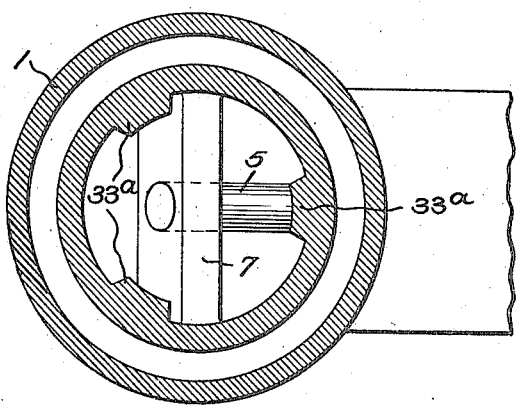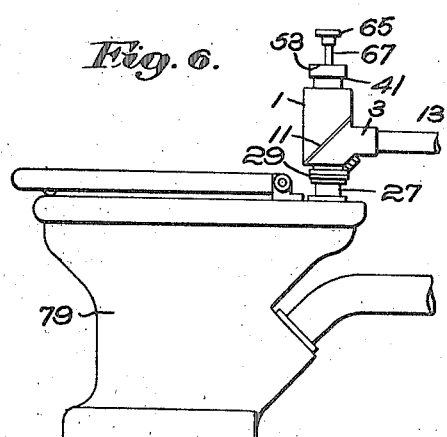

ELBERT E. LOCHRIDGE, OF SPRINGFIELD, MASSACHUSETTS.

VALVE FOR WATER-CLOSETS AND OTHER USES.

1,270,423.   Specification of Letters Patent.   Patented June 25, 1918.

Application filed August 13, 1915. Serial No. 45,401.

*To all whom it may concern:*

Be it known that I, ELBERT E. LOCHRIDGE, a citizen of the United States, and a resident of Springfield, in the county of Hampden and Commonwealth of Massachusetts, have invented an Improvement in Valves for Water-Closets and other Uses, of which the following description, in connection with the accompanying drawings, is a specification, like characters on the drawings representing like parts.

This invention relates to valves, and, among other objects, aims to provide a simple and effective device for controlling the admission of flushing water to the bowl of a water-closet.

The character of the invention may be best understood by reference to the following description of an illustrative embodiment thereof shown in the accompanying drawings, wherein:

Figure 1 is a vertical section through an illustrative valve mechanism embodying the invention;

Fig. 2 is a view showing parts appearing in Fig. 1, but in a different relation;

Fig. 3 is a transverse section taken on line 3—3 of Fig. 1;

Fig. 4 is a transverse section taken on line 4—4 of Fig. 1;

Fig. 5 is a transverse section taken on line 5—5 of Fig. 1; and

Fig. 6 is a side elevation of a bowl of a water-closet equipped with the valve mechanism.

Referring to the drawings, in Fig. 1 is shown a fitting comprising cylindrical sections 1 and 3 which may be connected on a miter joint and be secured together by a stud bolt 5 entered through a bore in section 3, tapped into a bridge bar 7 extending across section 1 and having its head bearing against an external shoulder 9 formed on section 3. To contribute to the preventing of leakage at said joint a packing ring 11 of appropriate material may be interposed between said sections. The bolt may be readily tightened and loosened to permit one of the sections to be adjusted relatively to the other for a purpose to be described.

Water may be introduced into the fitting through an inlet pipe 13 tapped into the section 3. The water thus introduced may pass from the section 3 upward through a passageway or chamber formed by a cylindrical wall 15 within the section 1 spaced from and secured to the outer wall thereof by lugs 17. The upper end of the cylindrical wall 15, is counterbored and tapped to receive a disk 19 having an orifice therein and a groove for receiving a ring 21 of rubber or other packing material and serving as a valve seat, as more fully hereinafter described. The water may pass through said orifice upward, outward, and thence downward through the annular chamber formed between the outer and inner walls of section 1. The water flows thence into a chamber 23, formed in the section 3 and communicating with a neck 25 adapted to receive an outlet pipe 27. To prevent leakage between said neck and pipe the former is tapped to receive a collar 29, having an internal flange for pressing packing material 31 against the pipe. This connection will permit more or less movement of said pipe longitudinally of said neck, and, at the same time, effectively prevent any possibility of leakage between them.

Next will be described means for controlling the passage of the water through the orifice in the fitting. To accomplish this there is provided a valve 33, Fig. 1, having a domed or rounded portion 35 preferably of sphere segment form adapted to engage the valve seat on a circular line, thereby insuring a tight fit between them while permitting more or less rocking of the valve without destroying the tightness of the fit, and enabling the valve to move to and from its seat with a minimum amount of friction. Furthermore, the rounded valve by virtue of its taper enables it to always remain tight even if the effective orifice opening is enlarged by the wear on the packing ring 21. To contribute to the guiding of the valve, its lower end may have a flange adapted to slide along ribs 33ª projecting inward from the wall 15.

The valve 33 is mounted fast on a sleeve 37 projecting upward centrally therethrough, past the valve seat and connected to a piston 39 mounted in a cylinder 41 having an external flange 43 at its lower end tapped into the fitting member 1. To prevent leakage between said piston and cylinder the former is provided with an apron packing 45, secured thereto.

It will be observed the lower face of the valve 33 is substantially smaller in area than the piston 39. This difference in area is utilized to enable the opening of the valve by the differential pressure of the water on said valve and piston. To control the admission of water into said cylinder above said piston a tubular valve 47 is mounted in the sleeve 37 and the upper end thereof is adapted to engage a packing ring 49 of appropriate material, set in the counter-bore of a boss 51 depending from the head 53 of the cylinder 41. The lower end of the tubular valve is provided with a packing ring 55 secured in place by a nut 57 tapped into a counter-bore in the lower end of the said tubular valve.

To move said tubular valve away from its seat 49 at the desired times a stem 59, smaller than the bore of said tube, is tapped into ribs 61 projecting inwardly from said tube, thereby preventing the obstruction of the upward passage of water through said tube. The stem 59 projects upward through a plug 63 fixed in said boss 51, and is provided at the upper end thereof with a handle knob 65. The tubular valve is urged toward its seat by a helical spring 67 encircling said stem 59 and confined between said knob and the upper end of the plug 63.

When the knob is depressed the tubular valve will be moved downward away from its seat 49, thereby permitting water to rush upward through said tubular valve and thence outward past said seat into the chamber between the piston and the head of its cylinder. The pressure on said piston causes the same to move downward, thereby moving the valve 33 away from its seat (Fig. 2) and permitting the water to flow through the orifice outward and downward through the annular chamber between the outer and inner walls of the fitting section 1. The water passes thence through the chamber 23 and discharges through the outlet pipe 27.

It is merely necessary to depress the knob 65 momentarily to enable the opening of the valve 33. Promptly after the release of said knob the tubular valve 47 is returned to its seat by the spring 67, and in the course of its movement cuts off the flow of water into the cylinder transversely to its outward direction of flow past the valve seat 49.

The body of water thus confined in the cylinder would prevent the return of the valve 33 to its seat if no provision is made for the escape of the water from said chamber. An important feature of the invention relates to means for permitting the gradual escape of the water from said chamber for effecting the gradual closing of the valve 33. To accomplish this a duct 69 (Fig. 1) is made in the cylinder head extending upward, inward, and thence downward through the boss 51, and through the packing 49. This duct is adapted to communicate with longitudinal passages 71 formed in said tubular valve 47. These passages in turn communicate with an annular passage 73 formed between said tubular valve and the sleeve 37. This annular passage communicates through a port 75 with the chamber between the inner and outer walls of the fitting.

The water confined between the cylinder head and piston will gradually escape therefrom through the duct 69, passages 71 and 73, and port 75, thence through the annular space between the outer and inner walls of the fitting to the outlet pipe. The gradual seepage of the water will permit the piston and valve 33 to move slowly upward under the pressure on the lower face of said valve. Thus the valve will move gradually toward its seat. Heretofore valves used for the purpose described herein have snapped to their seats with an objectionable loud report, and with more or less uncertainty in the accurate seating thereof and consequent leakage. By the construction described these objections are overcome since the valve moves noiselessly and gradually to its seat and always fits accurately on the seat so as to prevent any possibility of leakage between them.

To regulate the escape of the body of water confined between the cylinder head and piston, a needle valve 77 may be tapped into said head and be adapted to throttle the duct 69 more or less as desired.

To insure the closing of the valve 33 to its seat if for any reason the water pressure thereon should be removed or unduly diminished, a spring 78 may be provided confined between said valve and the bridge bar 7 referred to.

Referring to Fig. 6, 79 designates the bowl of a water-closet equipped with the valve mechanism shown herein as embodying the invention. As shown, the outlet pipe 27 extends downwardly, vertically from the fitting, and is connected to said bowl. These bowls vary in construction. Some are designed to receive the flushing pipe vertically, and some horizontally. The dividing of the valve fitting into sections connected on a miter joint provides a construction which is readily adaptable for either condition. If it is desired to connect the outlet pipe to the bowl horizontally it is merely necessary to release the stud bolt 5 slightly. This will permit the fitting section 3 to be rotated through an arc of 180° on the axis of said stud bolt, thereby causing the inlet and outlet pipes to exchange positions. The inlet water, however, in either adjustment, passes upward through the inner chamber formed by the wall 15 of the fitting section 1, and the discharge water passes outward through the annular space between the outer and inner walls of said fitting section 1.

While the valve mechanism is shown herein as applied to a water-closet it will be apparent that it may be employed for other uses as desired.

It will be understood that the particular embodiment of the invention shown in the drawing is selected for illustrative purposes merely, and that extensive deviations may be made therefrom without departing from the spirit and scope of the invention as set forth in the appended claims.

What I claim as new, and desire to secure by Letters Patent, is:

1. A valve mechanism comprising a fitting divided into sections, one of said sections carrying a main valve and a control valve, and the other of said sections having outlet and inlet members, and means adjustably connecting said sections having provision permitting said members to exchange places with one another.

2. A valve mechanism comprising a fitting divided into sections, one of said sections having chambers therein, and also having a main valve for controlling the communication between said chambers, the other section having an inlet member communicating with one of said chambers and an outlet member communicating with the other chamber, and means adjustably connecting said sections having provision permitting said members to exchange places with one another without loss of communication with their respective chambers.

3. A valve mechanism comprising a fitting divided into sections, one of said sections having outer and inner chambers therein, and also having a main valve for controlling the communication between said chambers, the other section having an inlet member for communication with one of said chambers and an outlet member for communication with said other chamber, said members having provision permitting them to exchange places without loss of communication with their respective chambers.

4. A valve mechanism comprising a casing having passages therein, a valve for controlling communication between said passages, a cylinder, a piston therein, a sleeve connecting said valve with said piston, a tubular valve in said sleeve for controlling the admission of fluid from one of said passages to said cylinder, means for opening said tubular valve, means tending to close the same and means for reversing the relation of said inlet and outlet passages relative to said valves.

5. A valve mechanism comprising a casing having passages therein, a valve for controlling the communication between said passages, a cylinder, a piston therein, a sleeve connecting said valve with said piston, a tubular valve for controlling the admission of fluid from one of said passages to said cylinder, and means for enabling the gradual escape of fluid from said cylinder including a duct in the head of the cylinder, a passage in said tubular valve, and a port in said sleeve.

6. A valve mechanism comprising a casing having passages therein, a valve for controlling the communication between said passages, and means for operating said valve including a cylinder, a piston therein, a sleeve connecting said valve with said piston, a valve seat mounted on the head of said cylinder, a tubular valve in said sleeve coöperating with said seat and having an opening therethrough for the passage of fluids to operate the first-named valve, means for moving said tubular valve from its seat, and means independent of the main valve tending to maintain said valve on its seat.

7. A valve mechanism comprising a casing having passages therein, a valve for controlling the communication between said passages, a cylinder, a piston therein, a sleeve connecting said valve with said piston, a tubular valve for controlling the admission of fluid from one of said passages to said cylinder, and adjustable means for enabling the gradual escape of fluid from said cylinder including a duct in the head of the cylinder, a passage in said tubular valve, and a port in said sleeve.

8. A valve mechanism comprising a main valve, a piston for operating the same, a cylinder for said piston, and means for admitting fluid pressure through said main valve to said cylinder to open said main valve, including an auxiliary valve independent of said main valve.

9. A valve mechanism comprising a fitting having an inlet passage and an outlet passage, a reversible body portion operatively interposed between said inlet and outlet passages to permit reversal of function of said passages, said reversible body portion carrying a main water actuated valve for separating said inlet and outlet passages and a manually controllable valve controlling the admission or exclusion of water from the valve operating portion of said main valve.

10. In a device of the class described, the combination of a water supply chamber, a water discharge chamber, a valve separating said chambers normally held closed by water pressure, manually controllable means for by-passing water to open said valve by water pressure, two conduits one for conducting water to said valve, the other for conducting water from said valve and means for reversing the functions of said conduits while maintaining unchanged the direction of water flow through said valve.

11. A valve mechanism comprising a casing having passages therein, a main valve for controlling communication between said passages and means for operating said main valve including a cylinder, a piston therein, a sleeve connecting said valve and said piston, a valve seat mounted on the head of said cylinder, a tubular valve in said sleeve cooperating with said seat, means for moving said tubular valve from its seat to permit flow of fluid through said tubular valve to one side of said piston, and means independent of the main valve tending to maintain said tubular valve on its seat.

12. Valve mechanism comprising, in combination, a casing having inlet and outlet passages therein, a main valve controlling communication between said passages and means for operating said main valve including a cylinder, a piston therein connected to said main valve, a control passage through the said main valve and said piston for admitting fluid to one side of said piston to open said valve, and an auxiliary valve, having a seat independent of the main valve and piston, for controlling the flow of fluid through said control passage.

13. Valve mechanism comprising, in combination, a casing having inlet and outlet passages therein, a main valve controlling communication between said passages and means for operating said main valve including a cylinder, a piston therein connected to said main valve, a control passage through said main valve and said piston for admitting fluid to one side of said piston to open said valve and a tubular auxiliary valve having a seat in the head of the cylinder for controlling the flow of fluid through said control passage.

14. Valve mechanism comprising, in combination, a casing having inlet and outlet passages therein, a main valve controlling communication between said passages and means for operating said main valve including a cylinder, a piston therein connected to said main valve, a control passage through said main valve and said piston for admitting fluid to one side of said piston to open said valve and a tubular auxiliary valve having a seat in the head of the cylinder for controlling the flow of fluid through said control passage, the seating portion of said auxiliary valve being of substantially the same area as a cross-section of the body of said tubular valve.

15. In valve mechanism having a main valve and a piston therefor, a control valve constructed of two tubes or cylinders, one within the other, providing two water passages, one in the center of the inner tube, the other in the concentric space between the two tubes, one of said passages serving to admit water to the cylinder in which said piston operates, the other of said passages to carry the water from said cylinder to a point where it will be discharged with the discharge water from the main valve.

16. In valve mechanism having a main valve and a piston therefor, a control valve constructed of two tubes or cylinders, one within the other, providing two water passages, one in the center of the inner tube, the other in the concentric space between the two tubes, one of said passages serving to admit water to the cylinder in which said piston operates, the other of said passages to carry the water from said cylinder to a point where it will be discharged with the discharge water from the main valve, and a port arranged to receive the discharge from the control valve in all relative positions of the different portions of the entire valve mechanism.

17. A valve mechanism comprising, in combination, a main valve, a tubular controlling valve therefor carried by said main valve, a seat for said tubular valve in a stationary part of the mechanism, a chamber adjacent said seat for the reception of water to operate said main valve, the pressure of said controlling valve against its seat being entirely unaffected by variations in fluid pressure in said chamber.

18. A valve mechanism comprising, in combination, a main pressure controlled valve and a tubular pressure controlling valve therefor carried by said main valve, said tubular controlling valve providing passages therethrough, one for admission of pressure fluid to open said main valve, and the other for the exhaust of pressure fluid thereby to permit closure of said main valve.

In testimony whereof, I have signed my name to this specification, in the presence of two subscribing witnesses.

ELBERT E. LOCHRIDGE.

Witnesses:
MARY E. CARRINGTON,
BARTE J. GRIFFIN.

Copies of this patent may be obtained for five cents each, by addressing the "Commissioner of Patents, Washington, D. C."